Oct. 25, 1960   G. R. NEWTON ET AL   2,957,990
WELL FORMATION, DENSITY LOGGING
Filed Jan. 3, 1956   4 Sheets-Sheet 3

*INVENTORS:*
GEORGE R. NEWTON
BY JIMMIE E. SKINNER

*ATTORNEY*

Oct. 25, 1960     G. R. NEWTON ET AL     2,957,990
WELL FORMATION DENSITY LOGGING

Filed Jan. 3, 1956     4 Sheets-Sheet 4

INVENTORS:
GEORGE R. NEWTON
JIMMIE E. SKINNER
BY
*Newell Potter*
ATTORNEY

United States Patent Office 2,957,990
Patented Oct. 25, 1960

2,957,990

WELL FORMATION DENSITY LOGGING

George R. Newton and Jimmie E. Skinner, Tulsa, Okla., assignors to Pan American Petroleum Corporation, a corporation of Delaware Filed Jan. 3, 1956, Ser. No. 557,040

15 Claims. (Cl. 250—83.6)

This invention relates to logging wells and is directed particularly to logging the density and porosity of well formations by measurement of the scattering and/or absorption of penetrating radiations such as the gamma rays from radium. This application is a continuation-in-part of our application, Serial Number 401,186, filed December 30, 1953, which was a continuation-in-part of our application, Serial Number 189,016, filed October 7, 1950, both of said applications being now abandoned.

Successful measurements have been made of the density or thickness of materials by the interaction of gamma rays therewith. While the application of such measurement techniques to the logging of well formation densities has been proposed, for example, as taught in Russell Patent 2,469,461, no commercially practical system for routine logging of well formation densities has become available. While a close spacing or substantial contact between the radiation source, the detector, and the well formations may result in a large response to density changes as taught in that patent, such configurations also are characterized by both a shallow effective depth and a small effective volume of investigation. These are limitations which affect the application of the method to practical well logging for the reason that, in deep wells such as those normally drilled for obtaining production of oil and gas, the invasion of drilling-fluid filtrate into the formations and the thickness of mud filter cake on the well walls are often sufficient to influence unduly the accuracy of a gamma-ray scattering or absorption log obtained using a very close spacing of the source and detector.

Furthermore, the density and porosity of uniform-appearing rocks have been observed to vary much more widely from point to point than would often be expected. In logging for the purpose of measuring formation density, therefore, it is highly desirable to obtain readings which average the density of as large a volume of rock as possible. Since short source-detector spacings respond to the properties of correspondingly small rock volumes, however, they do not fully utilize the penetrating power of gamma rays, which power can be very effectively employed for this averaging function. In fact, even with maximum utilization of the most penetrating of gamma rays which can be conveniently provided, there are times when a still larger volume of investigation would be desirable.

It is, therefore, a primary object of our invention to provide, for logging the density of well formations, an improved method and apparatus which has an effective depth and volume of investigation large enough to minimize the effects of fluid invasion, varying thicknesses of mud filter cake, and point-to-point density variations within any given type of sedimentary rock. Another object is to provide, for well-formation density logging, a method and apparatus in which the geometrical arrangement of the source and detector relative to each other and to the exposed formations is an optimum for revealing changes in the average formation density. A further object is to provide, for logging the density of well formations, a method and apparatus minimizing the effect of changes in the diameter of the well. Still another object is to provide an appropriate correction for well-diameter variations which are great enough to affect the accuracy of the density determinations. A still further object is to provide a formation-density logging method and apparatus having primarily an absorption type of response to density variations over substantially the entire range of densities of interest in well logging. Still a further object is to provide a logging method and apparatus for obtaining data from which well-formation porosities can be determined. Other objects, uses, and advantages of the invention will become apparent as the description proceeds.

In accordance with our invention, the foregoing and other objects are accomplished by taking advantage of our discovery that there is an optimum value for the spacing between the gamma-ray source and detector of a density-logging instrument which is substantially greater than the spacings taught by the prior art. At this optimum spacing the response of the instrument to sedimentary rock densities, considered relative to its response to borehole-diameter variations, is a maximum. Considering the range of sedimentary rock densities of interest to extend from about 2.0 to about 3.0 grams per cc., this optimum source-detector spacing has been found to lie generally in the range from 15 to 30 inches, when a gamma-ray source of practical size is employed, for example, from 100 to perhaps 1,000 millicuries of radium or radioactive cobalt. We have observed that, with these spacings and source strengths, the density $\rho$ within this range and the recorded detector reading R are related by the formula $\rho = K_1 - K_2 \log R$, where, for any given diameter of well bore and density of fluids filling the bore, $K_1$ and $K_2$ are constants depending on the size of the gamma-ray source, the source-detector spacing, the arrangement of shielding materials, the detector sensitivity, the amplification employed, and other apparatus variables.

In making use of such source-detector spacings, we have further found it of major importance to maintain constant the geometrical relationships of the source, detector, shielding, and formations. Holding the spacing between the source and the detector substantailly constant is not difficult. The same is true of the placing of fixed shielding materials around the gamma-ray source and the detector. The geometry of the well formation relative to the source, detector, and shielding, respectively, however, is a different matter. Due to the variations in hole size and wall roughness normally encountered in wells, the shape of the formation face changes so much from point to point that about all that can be done is hold as much as possible of the shielding, source, and the detector in contact with the well wall for the maximum proportion of the time. We have observed that density errors due to lack of contact between the gamma-ray source and the wall are from 3 to 5 times larger than the errors due to lack of contact between the wall and detector. Accordingly our invention is directed particularly to maintaining the best possible contact between the source of radiation and the well wall.

In logging wells where the wall-contact conditions are quite variable due to excessive roughness or other factors which are unknown, the quality of the measurements obtained is sometimes so adversely affected that an overall improvement results if part of the maximum density sensitivity provided by the closest possible contact between the source and the wall is sacrificed. By recessing the source a small distance into the instrument body, large anomalous variations in the detector response are reduced to a greater relative extent than the response to varying formation densities. This will be better understood by reference to the accompanying drawings forming a part of this application, in which drawings:

Figure 1 shows a logging instrument, partially in cross section and embodying the invention, in operation in a well shown in cross section;

Figures 2, 3, and 4 are graphs showing the relationship between formation density and detector response in wells of certain different diameters and with different values of source-to-detector spacing;

Figure 6 is a view, similar to the view of Figure 1, showing a modification of the instrument of Figure 1;

Figure 1:
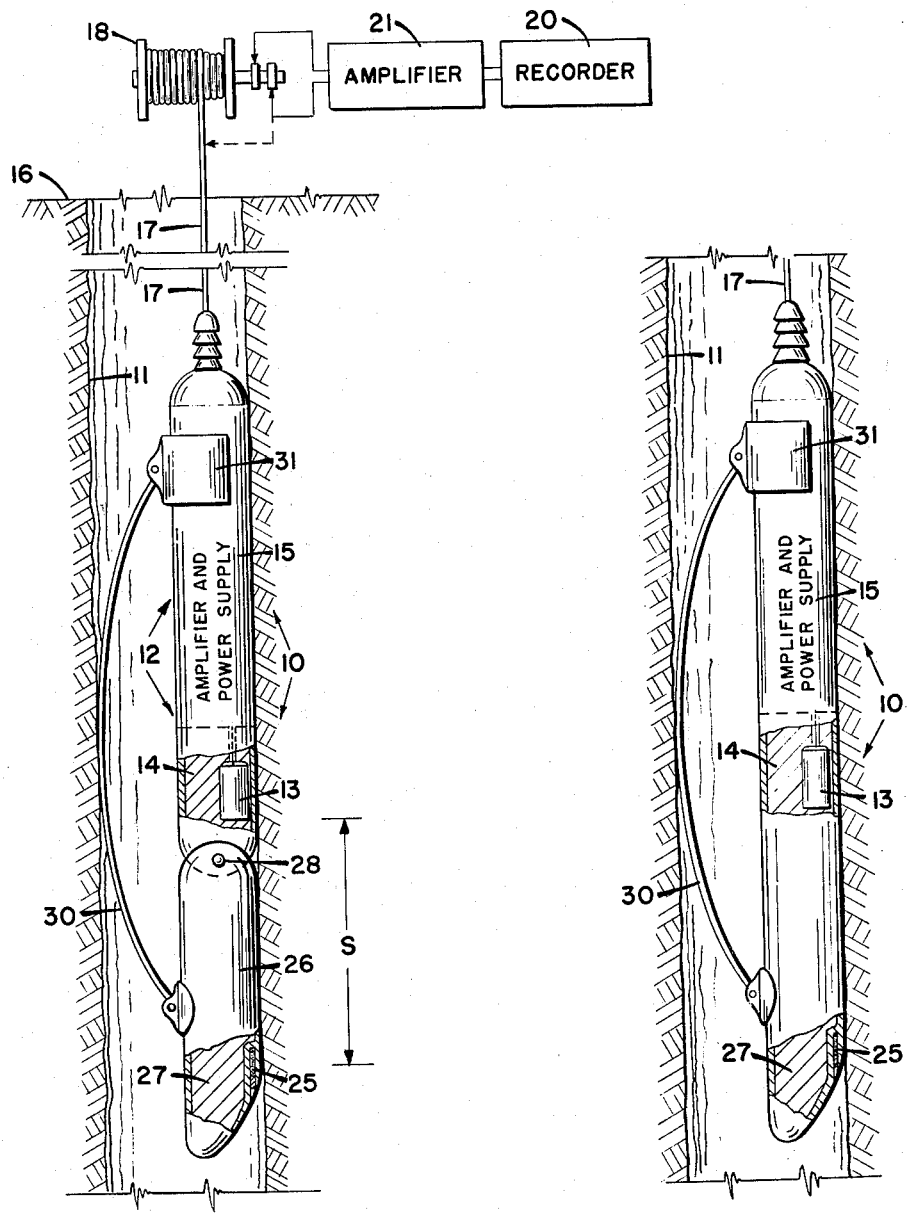

Referring now to these drawings in detail, and particularly to Figure 1, a logging instrument 10 embodying the invention is shown in operating position in a well 11 shown in cross section. The detector portion of instrument 10 comprises an upper housing 12 containing a detector 13, such as an ionization chamber or a Geiger-Mueller counter, at least partially surrounded by dense shielding material 14, for example, tungsten or lead, together with an amplifier and battery in a compartment 15 for amplifying and transmitting to the ground surface 16, over an insulated-conductor suspending cable 17, indications of the response of detector 13. Cable 17 is wound on a reel 18 at the ground surface 16, and such further amplification as is required for recording by a recorder 20 is provided by a surface amplifier 21 connected to the insulated conductor of cable 17 and to the armor sheath of the cable or to ground. As all of the surface recording and logging equipment may be of conventional form, no further detailed description is deemed necessary of this portion of the apparatus and its operation.

The lower portion of the instrument 10 below the detector 13 comprises a source 25 of penetrating gamma rays such as radium or radio-active cobalt, located adjacent or within the well-wall-contacting side of a hollow steel housing 26 which is preferably filled with a high-density shielding material 27 such as tungsten or lead which thus surrounds source 25 except on that side of housing 26 which contacts the formation face. Housing 26 is flexibly attached by a pivot or hinge 28 to the lower end of upper housing 12 in such a way as to permit the lower end of the housing 26, where source 25 is located, to swing toward or away from the axis of a well bore as necessary to maintain source 25 in contact with a well wall of irregular contour. To the outside of housing 26 about midway along its length is pivotally attached the lower end of an elongated, curved bow or leaf spring 30, the upper end of which is pivotally connected to a sliding collar 31 partially encircling the upper housing 12. Pressure of the middle portion of the spring 30 against one side of a borehole thereby presses both the source housing 26 and the detector housing 12 firmly into contact with the well wall on the opposite side.

It will be understood that, by making suitable provisions for maintaining the necessary electrical leads insulated from each other through the flexible joint, the detector 13, alone or with one or more stages of amplification, and its surrounding shielding 14, could be located within the lower housing 26 below hinge joint 28. While this arrangement is somewhat more difficult to devise mechanically, it would have the advantage, important in some situations encountered in logging wells, of maintaining the geometry of the source, detector, and associated shielding materials absolutely fixed and constant.

A number of opposing considerations enter into the choice of the spacing S between the source 25 and the lower end of the detector 13, so that the optimum value of this spacing is something of a compromise. Some of the factors in favor of making the spacing longer are: (1) a greater depth and volume of investigation and averaging; (2) greater space for more effective shielding against direct irradiation of the detector from the source; (3) a reduction of response variations due to poor contact conditions with a well wall; (4) lowered sensitivity to variations in density of the borehole fluids; and (5) a substantially straight-line relation between the density and the logarithm of the detector response. On the other hand, the advantages favoring a shorter value for spacing S are: (1) ability to utilize a smaller radiation source with correspondingly less expense and hazards to personnel during handling; (2) a higher level of detector response, with less statistical fluctuations and more complete elimination of the natural radioactivity of formations as background; (3) greater ease of maintaining contact with a well wall; and (4) sharper delineation of thin strata or the boundaries between adjacent strata.

In practice, with shielding 27 and 14 in place on the side of instrument 10 opposite that held in contact with the formations, to prevent as much as possible the emission and reception of gamma rays, respectively into and from the well-bore fluids, the spacing S is made about as large as possible in a well bore of minimum diameter and maximum density, without reducing the intensity level at the detector 13 so low that its response to the emitted gamma rays from source 25 becomes of the same order of magnitude as the statistical fluctuations or the natural gamma-ray intensity. For example, in a well bore of 6 inches diameter, with a given gamma-ray source having a strength in the range from 100 to 1,000 millicuries and gamma-ray energies similar to those from radioactive cobalt, the spacing of the source and detector and the amplification of the detector output are adjusted so that the recorded response R above the background radiation is close to full scale for a formation density of about 2.0 grams per cc., and preferably not less than 5% to 10% of the full-scale response for a formation density of about 3.0 grams per cc.

Figure 2:
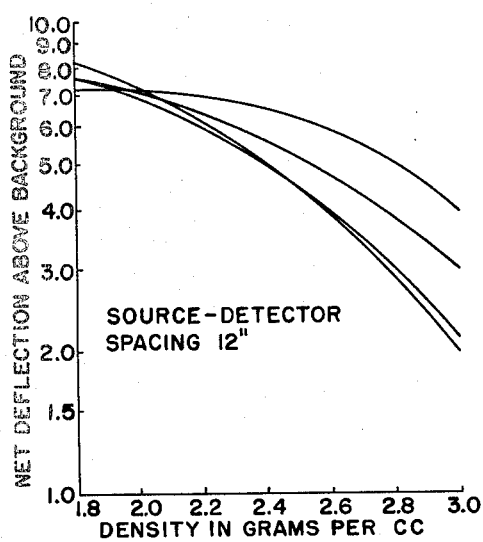
Figure 4:
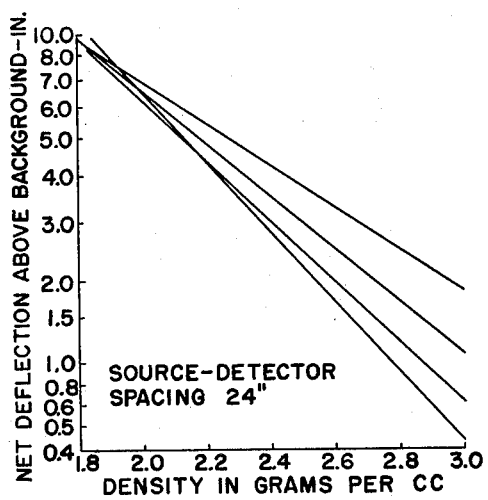
Figure 3:
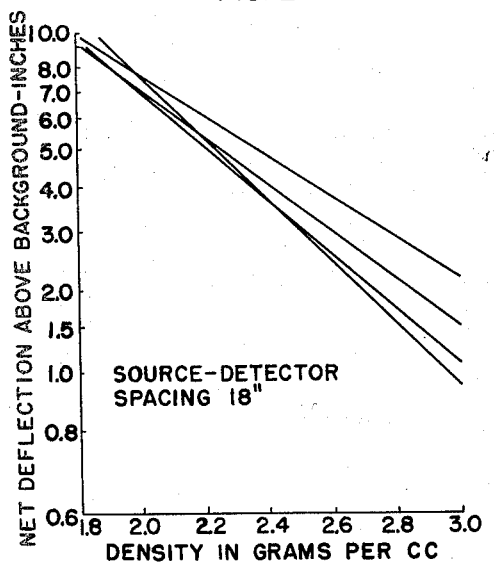

Figures 2, 3, and 4 are typical actual calibration curves run at different spacings on an instrument similar to that shown in Figure 1, using as the gamma-ray source about 300 millicuries of radioactive cobalt. To determine its response to variations of density and well-bore diameter, the instrument was placed in water-filled test wells of known diameter in materials of accurately known density. Well diameters of 6, 10, 16 and 26 inches were used, and the known density values were, respectively, about 2.0, 2.5, and 3.0 grams per cc.

Figure 2 shows the variation of detector response with density, with the instrument having a 12-inch spacing between the gamma-ray source and the detector. Each curve represents the density-response function in one of the four different diameter wells. It may be noted that, even in the 6-inch diameter well, the slope of the curve is not large, and it departs considerably from a straight-line curve which is generally considered characteristic of gamma-ray absorption. Thus, it is likely that, at this spacing, scattering or some effect other than absorption alone is present to contribute to the observed detector response.

Figure 3 shows similar curves for the instrument of Figure 1, with the 300-millicurie source separated 18 inches from the detector. Here the curves are substantially straight-line logarithmic curves, and the divergence between the lines in different-diameter wells of density 3.0 grams per cc. (indicative of the response to changing well diameter) is actually smaller in magnitude than for the 12-inch spacing, while the slope of the curve in the 6-inch diameter well (averaged over the interval from 2.0 to 3.0 grams per cc.) is quite large, indicative of good response to density.

The corresponding curves made at a 24-inch spacing of the source and detector are shown in Figure 4. These curves are generally straight lines as in Figure 3, and have slightly greater slope than in Figure 3, indicative of increased response to density. The divergence between the lines at density 3.0, however, is substantially larger than in Figure 3, more than offsetting the increased slope of the curves. It is apparent, therefore, that, for this particular instrument and source strength, 24 inches is larger than the optimum spacing for minimum relative response to diameter, or conversely for maximum density response relative to diameter response.

Figure 5:
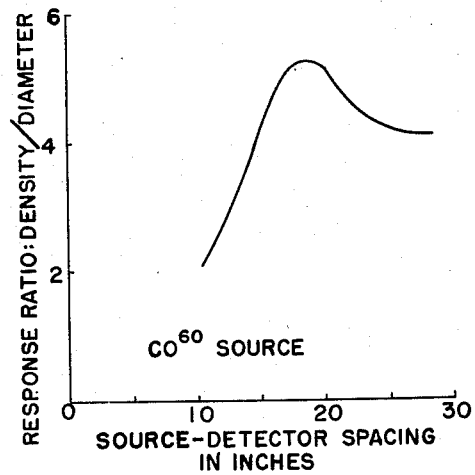
Figure 5 is a graph showing how the ratio of detector response to formation density, relative to the response to well diameter, varies as a function of the source-to-detector spacing.

This will be clearer upon reference to Figure 5 where the ratio of the response of the instrument to density to its response to diameter, determined as the ratio of the change in recorder deflection in a 6-inch well when the density changes from 2.0 to 3.0 grams per cc., to the magnitude of the divergence between the curves of the different-diameter wells of density 3.0, is plotted as a function of the spacing between the source and detector. Other spacings which were investigated were 15, 21, and 27 inches. The results obtained were intermediate between or similar to the curves of Figures 2, 3 and 4, respectively representing 12, 18, and 24 inches.

A clear maximum of this curve appears at a spacing of about 18 inches, where the relative density to diameter response is over 5 to 1. For shorter spacings this advantage drops off rapidly, while for longer spacings it declines gradually to about 4 to 1, the major portion of this decline occurring from about 18 to about 24 inches. For the larger spacings, however, the magnitude of the response in a well of density 3.0 grams per cc. becomes so low as almost to disappear below the level of statistical fluctuations.

While a larger source strength might make it possible to utilize somewhat larger spacings than those tested here, this would be of small assistance, as, for spacings of this magnitude (15 to 30 inches), the data indicate that an increase in spacing of the order of 10 inches requires a source strength increase of about 10 times to maintain the original signal response level. For example, if a source strength of 300 millicuries produces satisfactories signal levels over the density range from 2.0 to 3.0 grams per cc. with a 20-inch spacing, a source strength of the order of 3000 millicuries would be required to produce the same signal levels at 30-inch spacing. Thus, for satisfactorily using spacings larger than those within the range from about 15 to 30 inches, the necessary size of the gamma-ray source renders it too difficult and dangerous to handle without taking extraordinary precautions.

This is not to imply that precautions are unnecessary for sources up to 1,000 millicuries in strength, since shielding and special handling tools are necessary for such sources. The required shielding, however, is not so great as to interfere with portability, and the handling tools are not difficult to manipulate.

Having established a satisfactory spacing for the chosen size of gamma-ray source 25 for an instrument like that of Figure 1, its response at the chosen spacing, for example about 20 inches, is determined for various formation densities, well diameters, and borehole-fluid densities. For example, the response to well densities of 2.0, 2.5, and 3.0 grams per cc., in wells of diameters 6, 10, 16, and 26 inches, is determined, with the wells filled with each of several drilling fluids of various weights characteristic of those encountered in logging wells. Thus, for each weight of drilling fluid, a series of curves similar to those of Figure 3 made in the presence of water is obtained. Therefore, in logging wells it is necessary only to ascertain the weight of the drilling fluid filling the well bore and make sure that the response of the detecting and recording system is the same as it was during the calibration readings made with known density and diameter conditions.

Thus, the response of the detecting and recording system to a weak gamma-ray source of known strength is ascertained, both at the time of obtaining calibration curves like those of Figure 3 and immediately prior to and following each logging run. For example, having first ascertained the background response of the detecting and recording system and balanced it out to obtain a "zero" position on the recorder chart, the response of the detecting and recording system is ascertained when a weak gamma-ray source, such as 180 grams of monazite sand, is placed against the side of the detector in the absence of the logging gamma-ray source 25. This produces a "standard" recorder deflection at the time of initial calibration, and thereafter, prior to making any log in an actual well, the amplification of the recording system is adjusted to produce the same standard deflection.

Having thus standardized the response of the recording system at the beginning of any logging operation, the main gamma-ray source 25 is then placed in the instrument, and it is passed through a well for recording the variations in response due to formation density as a function of instrument depth. Preferably, also, at least once during the running of each well log, a check of statistical variations is made by holding the instrument stationary at a point in the well and moving the recorder chart as a function of time. At the end of each logging run, the sensitivity of the recording system is again checked with the monazite sand source held against the detector wall and the strong radioactive source 25 removed or shielded so that it cannot affect the detector. By thus adjusting and checking the detecting system sensitivity and background response before and after each logging run the likelihood of density errors due to instrument drift can be substantially reduced.

From the log of recorder deflection as a function of depth thus recorded, a log of density as a function of depth is prepared using appropriate calibration curves of the character of those shown in Figure 3 to plot the density corresponding to the detector response at each depth point. This is done with reference to a caliper log showing the variations in well diameter, which caliper log may be produced in any conventional manner. Wherever the caliper log shows the well diameter to deviate sufficiently from its "normal" value to produce a significant density error, interpolation between the curves for different diameters is made, or another calibration curve appropriate for the new value of the diameter is used.

From a log of formation density derived in this manner, taking into account the density of the fluid in the bore hole and the bore-hole diameter, a log of the formation porosity can be calculated. For this purpose it is necessary to know or to estimate the density of the liquid filling the pore spaces and the grain density of the sedimentary rock material, that is, the density the rock material would have in the absence of pore spaces between the grains. The porosity P in percent at any depth in the well is then given by the expression:

$$P = \frac{D_{gr} - D_{log}}{D_{gr} - D_{fl}} \times 100\%$$

where $D_{gr}$ is the grain density of the rock, $D_{log}$ is the saturated bulk density obtained from the derived density log mentioned above, and $D_{fl}$ is the known or assumed density of the fluid in the pore spaces.

Although it is known that different sedimentary rocks have grain densities ranging upwards from about 2.67 grams per cc., we have found that only small errors in calculating porosity P will result if the rock type is disregarded and an average value of the grain density of about 2.75 grams per cc. is assumed for $D_{gr}$. Of course, if the true grain density is known from recognition of specific formations on which careful measurements have been made, a more accurate porosity determination will result from use of the correct figure instead of an average or assumed value. Likewise, we have found it makes small difference in the calculated porosity P whether the fluid in the pore space is water or oil, respectively of assumed density 1.0 or 0.8 grams per cc. Thus, by using the true or assumed values for $D_{gr}$ and $D_{fl}$ and substituting in the above formula, for each point where a porosity determination is desired, the corresponding value of $D_{log}$ taken from the derived density log, a corresponding log of porosity P as a function of depth is obtained.

Generally speaking, the articulated instrument of Figure 1 gives satisfactory well logs under a wide variety of conditions. The rigid embodiment of the instrument shown in Figure 6, however, is particularly useful in wells where the diameter variation and wall roughness are not great. The instrument of Figure 6 resembles that of Figure 1 in all respects except that the hinge joint 28 has been omitted. This has two advantages: (1) It is easier to pass the rigid instrument through a well bore having abrupt hole enlargements, as the hinge joint 28 sometimes allows the housing 26 to swing partially crosswise in the bore hole; and (2) under some conditions of hole roughness or enlargement, the source 25 of the hinged instrument is inadequately shielded, and direct irradiation of the detector 13 occur. In Figure 6 this direct irradiation is prevented at the expense of more often losing contact between the wall and the source 25. Nevertheless for many purposes logs produced by the simplified instrument shown in Figure 6 are entirely satisfactory.

Figure 7:
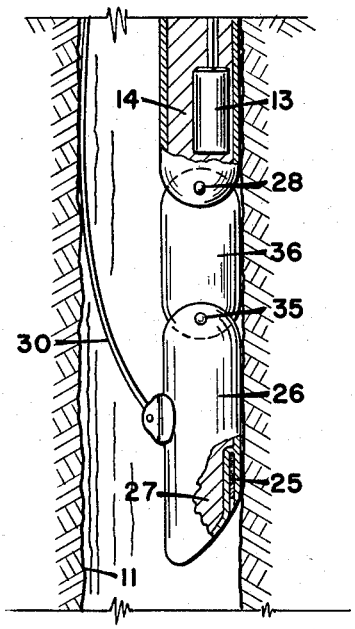
Figure 7 is a view similar to the lower portion of Figure 1 and showing a further embodiment of the invention.

A number of the disadvantages of the embodiments of both Figure 1 and Figure 6 are overcome by the modification shown in Figure 7. In this embodiment the housing 26 of Figure 1 is shortened, and an intermediate section 36, connected to housing 26 by a second hinge joint 35, is inserted between pivot 28, at the lower end of housing 12, and housing 26. Attachment of the end of spring 30 to the lower section 26 then insures that the source 25, together with its associated shielding within the lower section 26, makes the best possible contact with the well wall, regardless of the contact or lack of it between the detector 13 and the wall. As the housing 26 here may be as short as one foot or less in length, and is completely free to pivot to any angle or move sideways as a unit with respect to the upper housing 12, it can accordingly make good contact with depressions in a well wall which would be bridged across by the longer instruments of Figures 1 and 6. For maximum shielding effect, the housing 36 may be filled with tungsten or lead in the same manner as housing 26.

Figure 8:
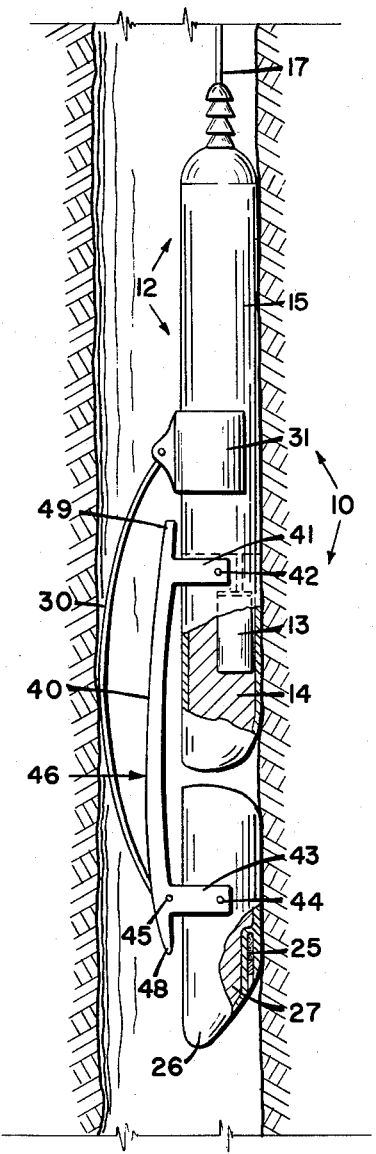
Figure 8 is a view similar to Figure 6 and showing a preferred linkage mechanism for coupling the radiation-source housing to the main instrument assembly.

In Figure 8 is shown a further embodiment of the invention, similar in mechanical principles of operation to that of Figure 7, but possessing certain added advantages. It will be observed with regard to Figure 7 that, under some conditions of rotation of the intermediate housing 36 relative to the upper housing 12, particularly if the spacing between pivots 28 and 35 is small, the effective spacing between source 25 and detector 13 can change by a small amount. This is not true of the arrangement of Figure 8 employing only two housings as in Figure 1. These housings are joined by a bar 40 extending along the side of instrument 10 nearest the well axis during logging, the upper end of bar 40 being attached to a yoke 41 engaging a pivot 42 on the outside of housing 12 at some distance above its lower end, and the lower end of bar 40 being attached to a similar yoke 43 engaging a pivot 44 on the outside of housing 26 about midway along its length.

The pivotal connection 45 to the lower end of spring 30 is located on bar 40 at its point of attachment to yoke 43, but if preferred may be moved upwardly to a point such as is indicated by the arrow 46 near the space separating the housings 12 and 26, so that the lateral spring force is divided between housing 26 and the lower end of housing 12. Also, bar 40 is preferably curved slightly away from the housings 12 and 26 to a point of maximum separation at the point 46 to permit greater angular rotations to occur respectively about the pivots 42 and 44. An extension 48 on the lower end of bar 40 acts as a stop for rotation of housing 26 about pivot 44 in the clockwise direction, and a similar extension 49 at the upper end of bar 40 limits the angle of rotation around pivot 42.

In this modification the sliding sleeve 31 is preferably located about midway along the length of upper housing 12 so that its lateral thrust on the portion of the instrument near detector 13 is greater. With this linkage thus limiting the displacements or rotations of housings 26 and 12 relative to each other, the major proportion of well-diameter variations can be accommodated without the instrument being so flexible as to turn crosswise and possibly lodge in a bore hole under some conditions.

Figure 9:
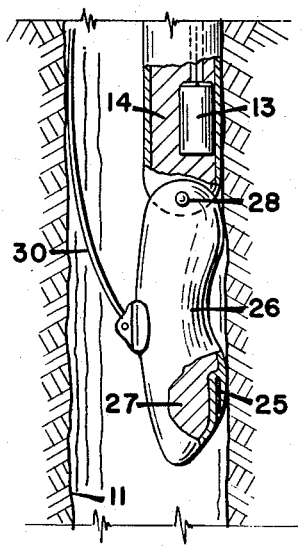
Figure 9 is a view similar to Figure 7 and showing a still further modification of the invention.

A still further modification of the source housing 26 is shown in Figure 9, where, for part of its length, the housing curves inwardly away from the well wall. This at times makes it easier than is true of the instrument of Figure 1, for the source 25 and part of its shielding 27 to maintain contact with the well wall in passing points of abrupt diameter change; but in other instances the lack of shielding material along the well wall at the curved section of the housing may let an unduly large amount of radiation traversing well bore 11 enter detector 13. In the latter respect—maintaining shielding in contact with the well wall at all times at at least one point between the source 25 and the detector 13—the embodiments of Figures 7 and 8 are superior.

In all of the embodiments or modifications described above, placing and maintaining the gamma-ray source 25 in the closest possible contact with the well wall provide maximum sensitivity to wall-density variations and, in cooperation with the preferred spacing from detector 13, minimize the relative response to well-diameter changes. In a majority of wells the data so obtained are satisfactory.

In a few wells, and at a few spots in many wells, however, we have observed that some anomalously high detector responses are obtained. These appear usually as "spikes" on the log that, if taken literally, would be interpreted as thin streaks of material of density so low as to be unrealistic. Sometimes they correlate with abrupt diameter oscillations visible on the caliper log. At other times no such cause is apparent. They can only be termed a general "rough-wall effect" of known or unknown cause, operative in addition to the diameter changes which can be easily seen on the caliper log and allowed for in interpretation.

Figure 10:
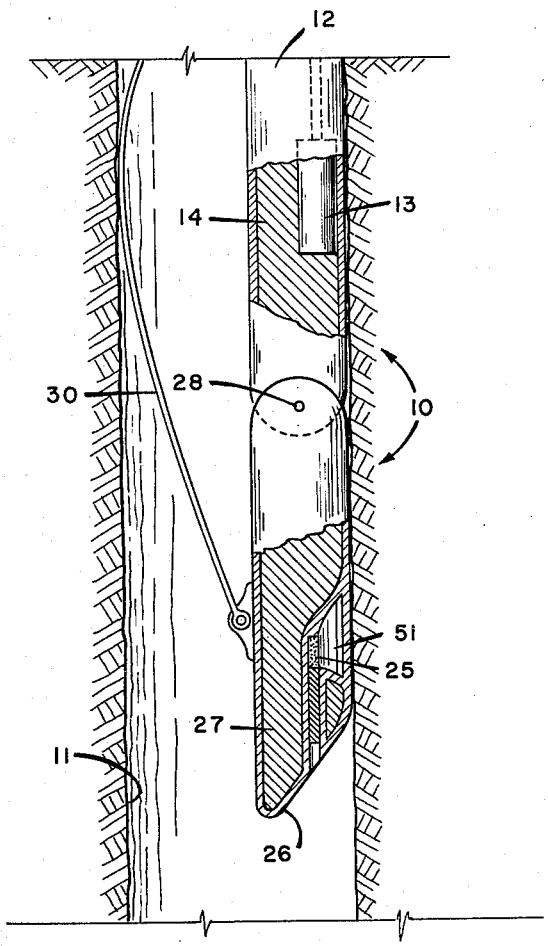
Figure 10 is a view, similar to Figures 7 and 9, of a modification of the invention which minimizes errors due to severe rough-wall conditions.

We have found that a substantial reduction in the "rough-wall effect" is provided by a source configuration as shown in Figure 10. By placing the source capsule 25 in a cavity or recess 51 from about ½ to 2 inches deep in the wall-contacting side of the heavy shielding material 27 filling the lower housing 26, the response "spikes" can be reduced in magnitude by as much as 50% or more. The reduction in density sensitivity of the logging instrument is noticeable but much smaller in terms of percentage.

Preferably the cavity or recess 51 between capsule 25 and the well wall is hollow—i.e., filled with air—but if desired it could be filled with any low-density liquid, or a light solid material, such as magnesium. Thus, with respect to gamma-ray emission by source 25, the cavity or recess 51 is "open" or has its "opening" against the well wall, even though it is physically closed by the shell of housing 26 or filled with a low-density material relatively transparent to gamma rays. In wells where accumulation of materials of variable or unknown density in recess 51 was no problem, it could be left physically open.

The shape of the recess 51 may vary considerably, from a rather wide opening to a relatively narrow "tunnel" which produces a large degree of collimation of the gamma rays into a beam, but requires a correspondingly larger source strength for a given detector-response level. In any event the shielding material 27 nearest source 25 is of maximum density, and is thus preferably a heavy tungsten alloy. It should also be noted that the source recess 51 can be used in any of the other embodiments described above in Figures 6, 7, 8, and 9.

While we have thus described our invention in terms of the optimum values of the variables known to us, it is to be understood that still further modifications will be apparent to those skilled in the art. For example, reduction in the amount of detector shielding 14 placed on the side of the detector exposed to bore-hole fluids, raises the response level so that somewhat longer spacings between source and detector can be used, but as a major fraction of the increased radiation is made up of nonsignificant rays traversing the bore hole, the relative response to formation density is usually not improved. The invention, therefore, should not be considered as limited strictly to the embodiments described in detail, but its scope is properly to be ascertained from the appended claims.

We claim:

1. Apparatus for logging to determine the density of formations exposed in a well bore which comprises an elongated housing adapted to be passed through a well bore, a detector of gamma rays in said housing, a concentrated source of gamma rays spaced from said detector by a fixed distance of between about 15 and 24 inches, spring means for maintaining said source as closely as possible at a constant fixed distance of less than 2 inches from a well wall and for maintaining one side of said detector substantially in contact with a well wall, dense shielding material substantially surrounding said source and said detector except on the sides thereof nearest said wall, and means coupled to said detector for recording an indication of the intensity of the gamma rays received from said source.

2. Apparatus for logging to determine the density of formations exposed in a well bore which comprises an elongated housing adapted to be passed through a well bore, a detector of gamma rays in said housing, a concentrated source of gamma rays spaced from said detector by a fixed distance of between about 15 and 24 inches, dense shielding material substantially surrounding said source and said detector on all sides except one side which is adapted to be held against a well wall, said source being within a recess between about ½ and 2 inches in depth in said shielding, spring means for maintaining said one side of said detector and the opening of said recess substantially in contact with a well wall, and means coupled to said detector for recording an indication of the intensity of the gamma rays received from said source.

3. Apparatus according to claim 2 including also a flexible connection between said source and said detector adapted to maintain said distance substantially fixed.

4. Apparatus for logging to determine the density of formations exposed in a well bore which comprises a detector of gamma rays, a concentrated source of gamma rays spaced from said detector by a distance of between about 15 and 24 inches, a flexible connection between said source and said detector adapted to maintain said distance substantially fixed, circuit means coupled to said detector for recording an indication of the intensity of gamma rays from said source impinging thereon, and means attached to said source adapted to hold it as closely as possible at a constant fixed distance of less than 2 inches from the wall of said bore.

5. Apparatus for logging to determine the density of formations exposed in a well bore which comprises an elongated housing, a second housing, a concentrated source of gamma rays in said second housing, a flexible coupling attaching said second housing to said elongated housing and adapted to maintain said housings a substantially fixed distance apart, a gamma-ray detector in one of said housings spaced a substantially fixed distance between about 15 and 24 inches from said source, shielding material in said second housing substantially preventing direct irradiation of said detector by said source, and an elongated curved leaf spring attached to said second housing for holding said source as closely as possible at a constant fixed distance of less than 2 inches from the wall of said well bore.

6. Apparatus according to claim 5 in which said flexible coupling comprises a rigid member, a first pivot connecting said member to said elongated housing, and a second pivot connecting said member to said second housing.

7. Apparatus according to claim 6 in which said first pivot is located a substantial distance above the lower end of said elongated housing, and said second pivot is located about midway along the length of said second housing.

8. Apparatus for logging to determine the density of formations exposed in a well bore comprising an elongated housing, an amplifier in said housing, a gamma-ray detector connected to the input of said amplifier, a second housing, a concentrated source of gamma rays in said second housing at a substantially fixed spacing of between about 15 and 24 inches from said detector, gamma-ray-absorbing shielding between said source and said detector, a flexible coupling connecting said second and said elongated housings and adapted to maintain said housings a substantially fixed distance apart, means attached to said second housing to maintain said source as closely as possible at a constant fixed distance of less than 2 inches from the wall of a well bore, and a recorder connected to the output of said amplifier for recording as a function of depth in a well an indication of the response of said detector.

9. Apparatus for logging to determine the density of formations exposed in a well bore which comprises an elongated housing adapted to be passed through a well, a gamma-ray detector within said housing, a concentrated gamma-ray source emitting gamma rays having an energy and intensity of about those of 100 millicuries of radium in equilibrium with its products, said source being flexibly connected to said housing and spaced from said detector by a substantially fixed distance of between about 15 and 24 inches, shielding substantially preventing direct irradiation of said detector by said source, means for holding said source as closely as possible at a constant fixed distance of less than 2 inches from said formations, and means for recording as a function of depth in said well bore an indication of the intensity of the gamma rays scattered by sedimentary formations and impinging on said detector.

10. Apparatus for logging to determine the density of well formations comprising an elongated housing adapted to be passed through a well bore, a gamma-ray detector in said housing, circuit means connected to said detector for recording the intensity of gamma rays impinging thereon, a second housing, means flexibly attaching said second housing to said elongated housing, a concentrated source of gamma rays in said second housing spaced by a substantially fixed distance of between about 15 and 24 inches from said detector, shielding material in said second housing substantially preventing direct irradiation of said detector by said source, means attached to said second housing adapted to hold said source as closely as possible at a constant fixed distance of less than 2 inches from the bore wall regardless of the position of said elongated housing, said second housing being curved away from said wall between said source and said attaching means.

11. Apparatus for logging to determined the density of formations exposed in a well bore which comprises an elongated housing, a gamma-ray detector in said housing, circuit means connected to said detector and adapted to record an indication of the intensity of gamma rays impinging on said detector, a concentrated source of gamma rays, shielding material between said source and detector and at least partially surrounding said source, a housing for said source, means attached to said source housing for forcing it and said source into intimate contact with the wall of a well bore, said source being spaced by a substantially fixed distance of between about 15 and 24 inches from said detector, and at least two flexible connections coupling said source housing and said elongated housing.

12. Apparatus for logging to determine the density of formations exposed in a well bore which comprises an elongated housing adapted to be passed through said bore, a gamma-ray detector in said housing, circuit means connected to said detector adapted to record an indication of the intensity of the gamma rays reaching said detector, a second housing, a source of gamma rays in said second housing at a substantially fixed distance of between about 15 and 24 inches from said detector, shielding material substantially filling said second housing, a hinge between said second housing and said elongated housing, and spring means attached to said second housing for maintaining both said source and said detector substantially in contact with a well wall, said spring means and said hinge between said source and said detector being effective to prevent said elongated housing from holding said source away from contact with said wall.

13. Apparatus according to claim 1 wherein said source is spaced from said detector by a fixed distance of about 18 inches.

14. Apparatus according to claim 4 wherein said source of gamma rays is spaced from said detector by a distance of about 18 inches.

15. Apparatus according to claim 9 wherein said source is spaced from said detector by a substantially fixed distance of about 18 inches.

References Cited in the file of this patent

UNITED STATES PATENTS

| | | |
|---|---|---|
| 2,369,672 | Hare | Feb. 20, 1945 |
| 2,469,461 | Russell | May 10, 1949 |
| 2,508,772 | Pontecorvo | May 23, 1950 |
| 2,711,482 | Goodman | June 21, 1955 |

Notice

In Interference No. 92,411 involving Patent No. 2,957,990, G. R. Newton and J. E. Skinner, WELL FORMATION DENSITY LOGGING, final judgment adverse to the patentees was rendered Sept. 16, 1964, as to claim 2.

This notice supercedes the notices previously issued in the Official Gazettes of Jan. 19, 1965, vol. 810, p. 587, and Mar. 30, 1965, vol. 812, p. 1297.

[*Official Gazette May 18, 1965.*]